April 21, 1925.  1,534,092
W. H. SOLLE
FRUIT DRYING APPARATUS
Filed May 19, 1924   2 Sheets-Sheet 1
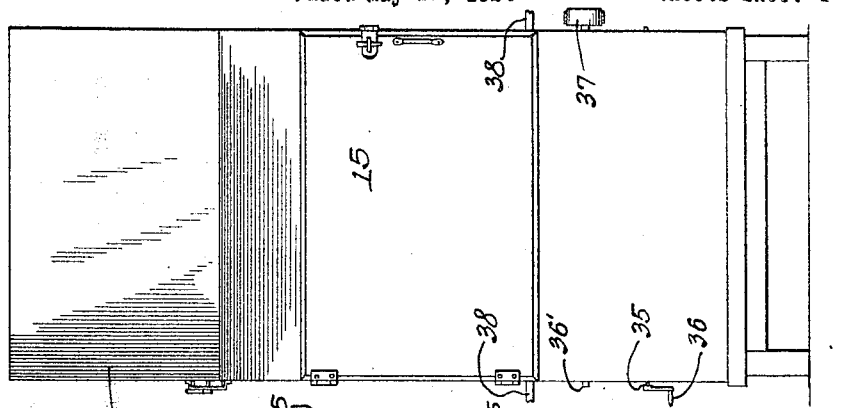
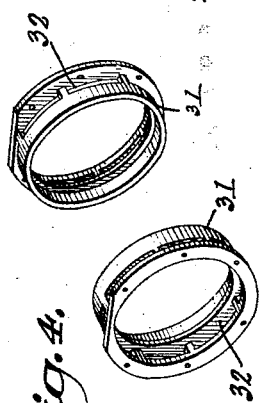
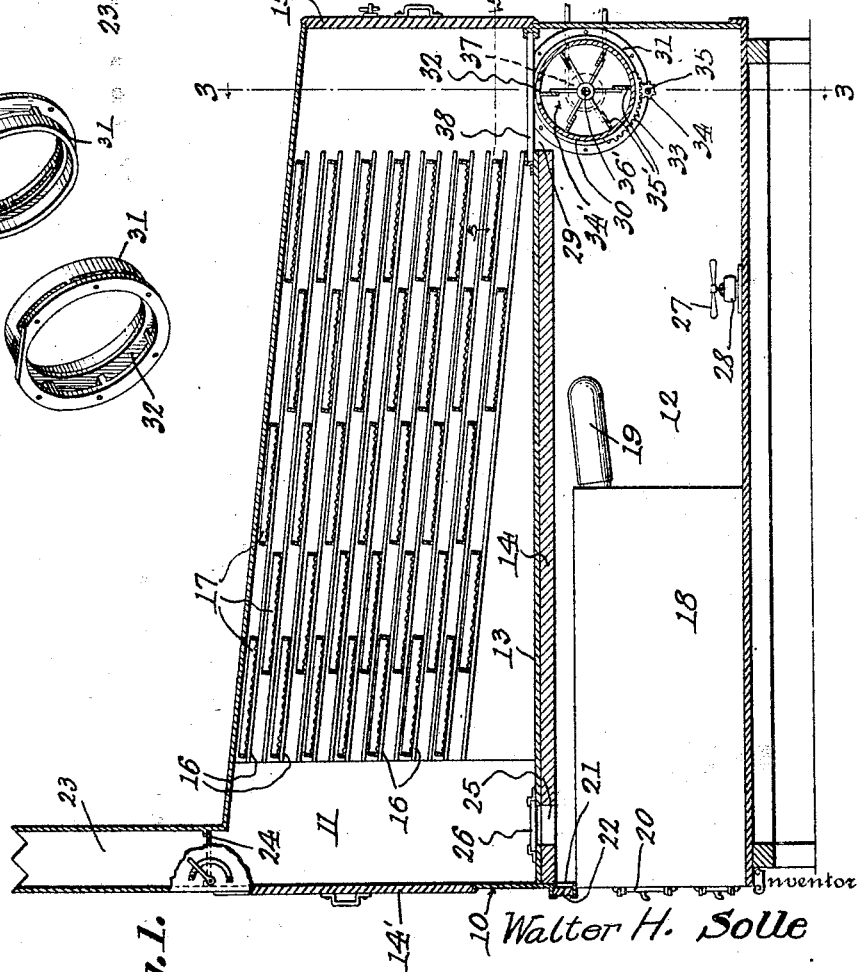
Inventor
Walter H. Solle
By Jerry A Mathews
Attorney

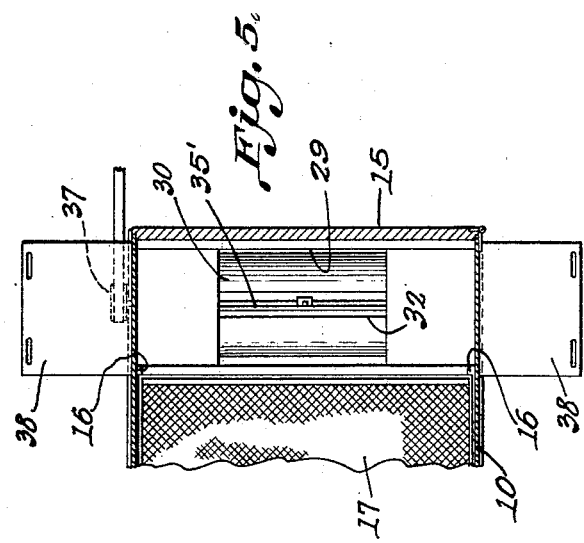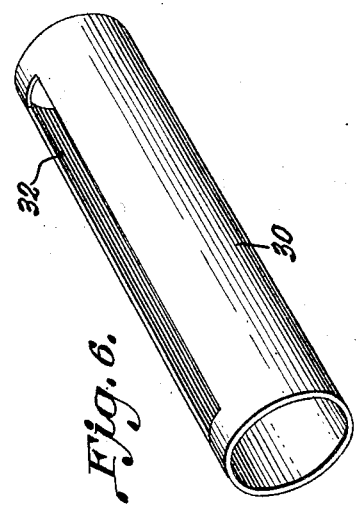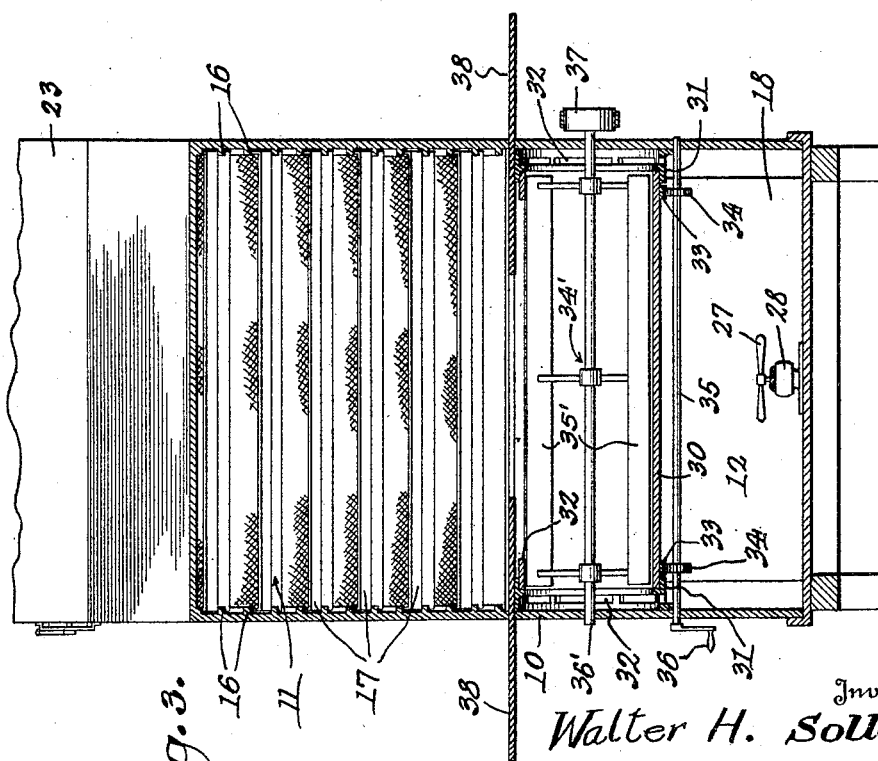

Patented Apr. 21, 1925.

1,534,092

UNITED STATES PATENT OFFICE.

WALTER H. SOLLE, OF WILBUR, OREGON.

FRUIT-DRYING APPARATUS.

Application filed May 19, 1924. Serial No. 714,448.

*To all whom it may concern:*

Be it known that I, WALTER H. SOLLE, a citizen of the United States, residing at Wilbur, in the county of Douglas and State of Oregon, have invented certain new and useful Improvements in Fruit-Drying Apparatus, of which the following is a specification.

My invention relates to fruit driers.

An important object of the invention is to provide apparatus of the above mentioned character, well adapted for drying prunes, or other small fruit, while not necessarily restricted to this use.

A further object of the invention is to provide means whereby heated air admitted into the drying chamber first acts upon the fruit in the most dried condition, and subsequently acts upon the remaining fruit, in succession, as the fruit increases in dampness, whereby injury to the damp fruit, which frequently occurs when such damp fruit is subjected to air heated at an excessive temperature, is avoided.

A further object of the invention is to provide means for angularly adjusting the discharge of the heated air from the blower, whereby it will be properly distributed, with respect to the fruit, for effecting a proper application of the heated air.

A further object of the invention is to provide means for agitating or mixing the heated air, prior to its discharge into the drying chamber.

A further object of the invention is to provide means for regulating the return of the air from the drying chamber to the heating chamber.

Other objects and advantages of the invention will be apparent during the course of the following description.

In the accompanying drawings, forming a part of this specification, and in which like numerals are employed to designate like parts throughout the same—

Figure 1 is a central vertical sectional view through a drying apparatus embodying my invention.

Figure 2 is an end elevation of the same.

Figure 3 is a transverse section taken on line 3—3 of Figure 1.

Figure 4 is a perspective view of the drum supporting spiders.

Figure 5 is a horizontal section taken on line 5—5 of Figure 1, and,

Figure 6 is a perspective view of the adjustable fan casing or drum.

In the drawings, wherein for the purpose of illustration is shown a preferred embodiment of my invention, the numeral 10 designates a casing, formed of sheet metal or any other suitable material. This casing is divided into an upper drying chamber 11, and a lower heating chamber 12, by means of a partition or wall 13, which may have heat insulation, as shown at 14. Access is had to the forward end of the drying chamber 11 by means of a door 14', and a door 15 provides access to the rear end of this drying chamber. Within the drying chamber are longitudinally inclined tracks 16, slidably receiving thereon trays 17, which hold the prunes or other fruit to be dried. These trays may preferably be arranged in a staggered relation, to permit of the discharge of the heated air therebetween, and the trays are suitably spaced vertically to permit of this discharge. As the fruit is dried, the trays are pushed down the inclined tracks and removed from the rear end of the drying chamber.

Mounted within the forward end of the heating chamber 12, is a furnace 18, having its smoke pipe 19 discharging from the rear end thereof through the side wall of the casing 10. Fuel is fed into the forward end of the furnace through doors 20 or the like, as is customary. This furnace is spaced from the side walls of the heating chamber 12 and from the top wall thereof, whereby the air may surround the same and become heated thereby, the furnace of course heating the entire chamber 12. Fresh air may be supplied in the chamber 12 at the forward end of the furnace, through an opening 21, which may be covered and uncovered by a slide 22. The heated air from the heating chamber 12 passes to the rear end of the drying chamber 11, in a manner to be described and then circulates forwardly through this drying chamber, in contact with the pans, and discharges into the forward end of this drying chamber. This heated air may now pass upwardly through a stack 23, in communication with the forward end of the chamber 11, if the valve or damper 24 is partly or wholly open, but if this damper is closed, the air cannot escape through the stack 23. This air may be returned into the forward end of the heating chamber 12, through an opening 25, if a slide valve 26, is partly or wholly opened, but when the slide valve is completely closed, the air is cut off from returning to the heating chamber 12.

I arrange a horizontally rotating fan 27, upon the bottom of the rear portion of the heating chamber 12, and drive this fan by means of a motor 28. The purpose of this fan is to thoroughly agitate and mix the air within the rear portion of the heating chamber, whereby its heat and moisture will be evenly distributed therein, before the discharge of the air at the rear end of the drying chamber 11.

The rear end of the partition or bottom 13 terminates at the rear end of the tracks 16, providing a relatively wide opening 29. Arranged within the rear end of the heating chamber 12, near and beneath the opening 29, is a rotatable or circumferentially adjustable cylindrical casing or drum 30, the ends of which are spaced from the side walls of the heating chamber 12, and are rotatably supported within the guide rings 31, or open spiders 32, whereby the air may enter this drum, through the ends thereof. The drum is provided in its upper portion with an elongated slot 32, which extends for substantially the entire length of the width of the drying chamber 11, or the pans held therein. The function of the rotatable drum is to provide means to angularly adjust the direction of discharge of the air through the opening 32, so that such direction of discharge may be regulated with respect to the vertical layers of the pans. It is obvious that the pans nearer the bottom, would ordinarly receive the most severe treatment from the incoming heated air, if it were constantly directed against them, but by angularly adjusting such direction of discharge, it may be substantially uniformly applied to all of the vertical layers. The drum 30 may be turned by any suitable means, and for this purpose, I secure segmental rack bars 33 to the lower portion thereof, and engage these rack bars with gears 34, rigidly mounted upon a transverse shaft 35, which may be turned by a crank 36. Rotatable within the casing or drum 30 is a centrifugal fan 34', embodying longitudinal radial blades 35', extending for substantially the entire length of the drum. This fan will draw in the heated air from the chamber 12, through the open ends of the drum, and discharge the same by centrifugal force, outwardly, through the elongated slot or opening 32, into the rear end of the chamber 11. This fan embodies a transverse shaft 36', having a pulley 37 mounted thereon, for turning it. This pulley may be driven by any suitable means, as is obvious.

I provide slides 38, operating across the opening 29, and adapted to wholly or completely cover the opening 29, when desired. These slides may be employed to regulate the volume of air passing from the fan, if desired, and when the slides are entirely open, and the fan is still, the machine may be used simply by allowing the natural circulation of the heated air, without the use of enforced feed. The slides 38 may also be adjusted to direct the heated air toward either side of the drying chamber.

The operation of the apparatus is as follows:

The prunes or the like are placed in the trays 17 and introduced into the forward end of the drying chamber, and as the drying process continues, they are advanced down the inclined trays, and are finally removed at the rear end of the drying chamber. In Figure 1, the trays are shown as originally placed within the drying apparatus. As the upper trays are pushed downwardly toward the lower end of the apparatus, they may contact with the lower trays, and the trays are thus fed through the apparatus. It is not essential that the spaces between the trays in each set be preserved, as satisfactory results are obtainable by having the trays in each set contacting with each other. However, should it be desired to maintain the trays in each set in spaced relation, suitable spacing elements (not shown) may be arranged upon the tracks, between the trays 17 in each set. With the fan 34' rotating, the heated air from the chamber 12 is forced upwardly into the rear end of the chamber 11, in proximity to the rear end of the tracks therein. The angularity of this discharge of air, may be adjusted by turning the drum 30, as explained. The tracks terminate at points spaced from the opposite ends of the heating chamber, and hence provide open spaces at these points. This heated air now passes longitudinally of the drying chamber, in contact with, or about the trays containing the fruit and finally discharges into the forward end of such chamber. A portion of this air may be discharged through the stack 23, or a portion of it may be returned through the opening 25 into the forward end of the drying chamber, whereby the circulation may be continuous, as desired. The fan 27 serves to agitate and mix the air, whereby the heat and moisture contained therein, will be thoroughly distributed within the same, prior to its discharge into the drying chamber. Particular attention is called to the fact that the fan 34', produces a radial current of air, having a length extending substantially throughout the entire length of the trays, whereby all portions of the trays are subjected to a substantial uniform heating action.

It is to be understood that the form of my invention herewith shown and described is to be taken as a preferred example of the same, and that various changes in the shape, size, and arrangement of parts, may be resorted to, without departing from the spirit of my invention, or the scope of the subjoined claims.

Having thus described my invention, what I claim is:

1. A fruit drier comprising a casing, means dividing the casing into an upper drying chamber and a lower heating chamber, heating means within the lower heating chamber, a blower mechanism arranged between the heating chamber and drying chamber and including a rotatable drum having a longitudinal discharge opening leading into the drying chamber, a centrifugal fan rotatable within the drum, and means to turn the drum upon its longitudinal axis.

2. A fruit drier comprising a casing, means dividing the casing into an upper drying chamber and a lower heating chamber, heating means within the lower heating chamber, blower mechanism for effecting a forced feed of air from the lower heating chamber to the upper drying chamber, means whereby the direction of travel of the heated air from the blower mechanism may be angularly adjusted, and means for supporting the fruit to be dried within the drying chamber.

3. A fruit drier comprising a casing, means for dividing the casing into an upper drying chamber and a lower heating chamber, heating means within the lower heating chamber, a drum pivotally supported near the rear end of the heating chamber and receiving heated air therefrom through its ends, said drum having a longitudinal slot for discharging the heated air into the end of the upper drying chamber, a rotary fan mounted within the drum, means to turn the drum upon its longitudinal axis, tray supporting means within the drying chamber, and outlet means for the drying chamber.

4. A fruit drier comprising a casing, means for dividing the casing into an upper drying chamber and a lower heating chamber, heating means within the lower heating chamber, a drum supported near the rear end of the heating chamber and receiving heated air therefrom through its ends, said drum having a longitudinal slot extending for substantially the width of the upper drying chamber, a rotatable fan within the drum embodying blades extending longitudinally within said drum, means to drive the fan, fruit supporting means within the drying chamber, and air outlet means for the drying chamber.

5. A fruit drier comprising a casing, means for dividing the same into an upper drying chamber and a lower heating chamber, said dividing means having an opening at the rear ends of said chambers, a force feed blower mechanism arranged adjacent to said opening for discharging heated air from the heating chamber into the drying chamber, means for partly or wholly covering said opening, heating means arranged within the heating chamber, fruit supporting means within the drying chamber, and air outlet means for the drying chamber.

6. A fruit drier comprising a casing, means within the casing for supporting fruit to be dried, a drum extending transversely of the casing near one end thereof and having a longitudinal opening, a rotary fan within the drum, means to turn the drum upon its longitudinal axis, means for supplying heated air to the drum, and air outlet means for the casing.

7. A fruit drier comprising a casing, means for dividing the casing into an upper drying chamber and a lower heating chamber with an opening between corresponding ends thereof, heating means within the heating chamber, a fan within the heating chamber to mix the air therein, fruit supporting means within the drying chamber, and air outlet means for the drying chamber adapted to discharge a portion of the air to the atmosphere or a portion of it back into the heating chamber.

In testimony whereof I affix my signature.

WALTER H. SOLLE.